United States Patent [19]

Savage

[11] 4,041,635
[45] Aug. 16, 1977

[54] FISHING POLE LEVERAGE DEVICE

[76] Inventor: Robert M. Savage, 271 Carnation Ave., Floral Park, N.Y. 11001

[21] Appl. No.: 692,468

[22] Filed: June 3, 1976

[51] Int. Cl.² ............................................. A01K 87/00
[52] U.S. Cl. ......................................................... 43/25
[58] Field of Search ....................................... 43/25, 23

[56] References Cited
U.S. PATENT DOCUMENTS 2,085,654  6/1937  Harris ..................................... 43/25
2,653,406  9/1953  Grabiak et al. ......................... 43/25

Primary Examiner—Louis G. Mancene
Assistant Examiner—Daniel J. Leach

[57] ABSTRACT

A device to afford leverage to fishermen when handling a fishing rod and reel. The device is attached to or formed with the handle of a conventional fishing rod and sized to extend to the underarm of the fisherman. One embodiment of the device is formed of material having lower density than water to afford flotation characteristics.

6 Claims, 2 Drawing Figures

FISHING POLE LEVERAGE DEVICE

FIELD OF THE INVENTION

The invention relates to devices for facilitating the handling of fishing rods. More particularly, the subject invention relates to devices for providing leverage to fishing rods to minimize the strength needed to react to forces imposed on the rod.

BACKGROUND OF THE INVENTION

1. Description of the Prior Art

It has long been recognized that fishing poles are subjected to variable forces which result primarily from the various size and aggressiveness of the fish caught on the line. Heavy sinkers and other auxiliary tackle devices also contribute to the force imposed on the line of a fishing rod.

As a result, it has been thought desirable to provide auxiliary apparatus which can be attached to the fishing rod to facilitate handling of the rod. Many such devices are now known.

For example, auxiliary handles, adapted to extend transversely from the rod or rod handle either vertically or horizontally have been designed. These auxiliary handles require that one hand of the fisherman be used to control the pole and one hand to be used to control the auxiliary handle. An auxiliary handle is illustrated in U.S. Pat. No. 2,761,236 (Sept. 4, 1956).

Further, fishing rod handle attachments have been provided which are formed with a contour surface to conform to the wrist or forearm of a fisherman. An illustration of such devices is seen in U.S. Pat. No. 3,410, 016 (Nov. 12, 1968). Further combinations of the auxiliary handle and auxiliary contour fitting surface are also known. U.S. Pat. No. 3,372, 510 (Mar. 12, 1968) discloses such a device.

In addition, mounts for fishing rods which provide a pivot about which the fisherman can rotate the entire rod also exist. Generally, these mounts are tubular devices into which the fishing rod handle can be inserted. The mounts are either fixed to a seat or elsewhere on a fishing boat or are arranged to be secured by a belt to the fisherman. U.S. Pat. No. 3,159,939 (Dec. 8, 1964) illustrates a mount into which a fishing rod can be inserted.

The state of the art does not include a device which provides a rigid column that automatically makes the fisherman's shoulder or underarm a reaction point against any load imposed on the fishing pole.

SUMMARY OF THE INVENTION

It is an objective of the present invention to provide a device which automatically and naturally enables a fisherman's body to react to the variable forces imposed on a fishing rod. It is a further objective of the invention to provide a device to afford a fisherman with added leverage when forces are imposed on a fishing rod, and, at the same time, allow the free use of both hands of the fisherman to handle the fishing rod and reel.

The device of the present invention is an extension attached to or formed with a fishing rod handle comprised of a rigid column which is adapted to nest in the underarm of the fisherman handling the rod. The extension terminates in an upper surface which is contoured to fit snugly and securely under the arm of the fisherman.

DESCRIPTION OF THE DRAWINGS

The preferred embodiment of the device of the present invention will be better understood when considered in view of the following drawings wherein.

DESCRIPTION OF THE PREFERRED EMBODIMENT

The device of the present invention is a leverage brace 2 which forms a rigid column between the handle 14 of a conventional fishing rod 4 and the underarm area of a fisherman. In practice, the rod 4 and leverage brace 2 act as a unified force transmitting column to the fisherman's body. The leverage brace 2 can be formed with the rod 4 or attached to the rod 4 as shown herein in the preferred embodiment.

Figure 1:
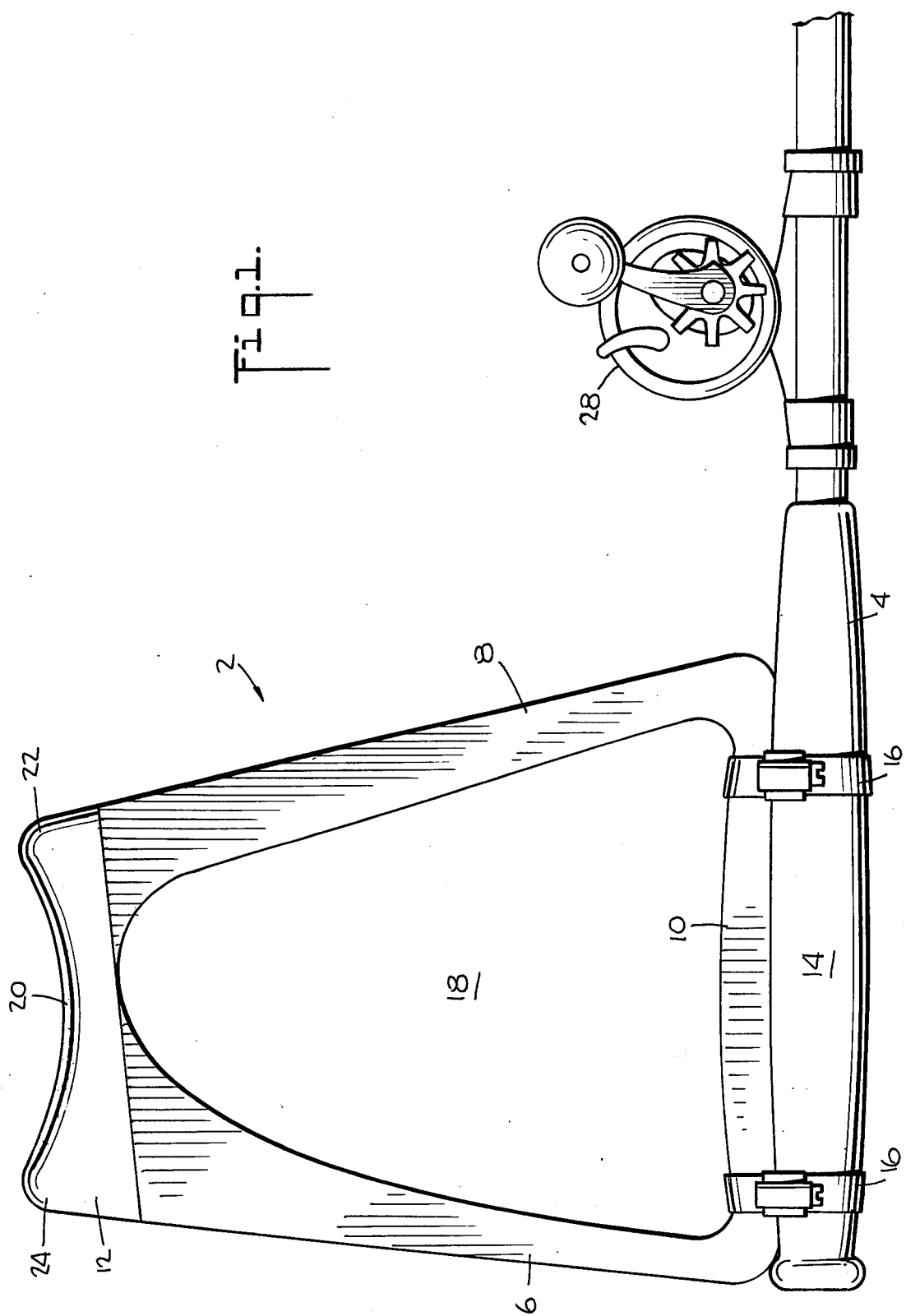
FIG. 1 is a side sectional elevational view of the preferred embodiment of the device shown attached to the handle of a conventional fishing rod.

As best seen in FIG. 1, the leverage brace 2 of the preferred embodiment is comprised of rigid column members 6 and 8, a base member 10 and an upper surface 12. The base 10 is adapted to attach directly to the rod handle 14 of a fishing rod 4. Means such as clamps 16 are provided to securely attach the base 10 directly against the upper surface of the handle 14 to project the leverage brace 2 vertically upwardly. The clamps 16 are attached to bear with sufficient force on both the rod handle 14 and base 10 to prevent rotation of the leverage brace 2 about the handle 14.

The rigid columns 6 and 8 extend directly upwardly and react the force from the body of the fisherman through the rod 4. In the preferred embodiment, an opening 18 is shown to provide a lightweight device. It should be noted that a single column or a brace formed with a center section connecting columns 6 and 8 can be used.

The upper surface 12 of the leverage brace 2 is configured to fit securely under the arm of the fisherman. As shown in the preferred embodiment, the upper surface 12 is provided with a concave centrally disposed section 20 and forward elevation 22 and rear elevation 24 to provide sufficient surfaces to retain the leverage brace 2 under the arm of the fisherman in the event horizontal forces occur which tend to move the brace forward or backward.

Figure 2:
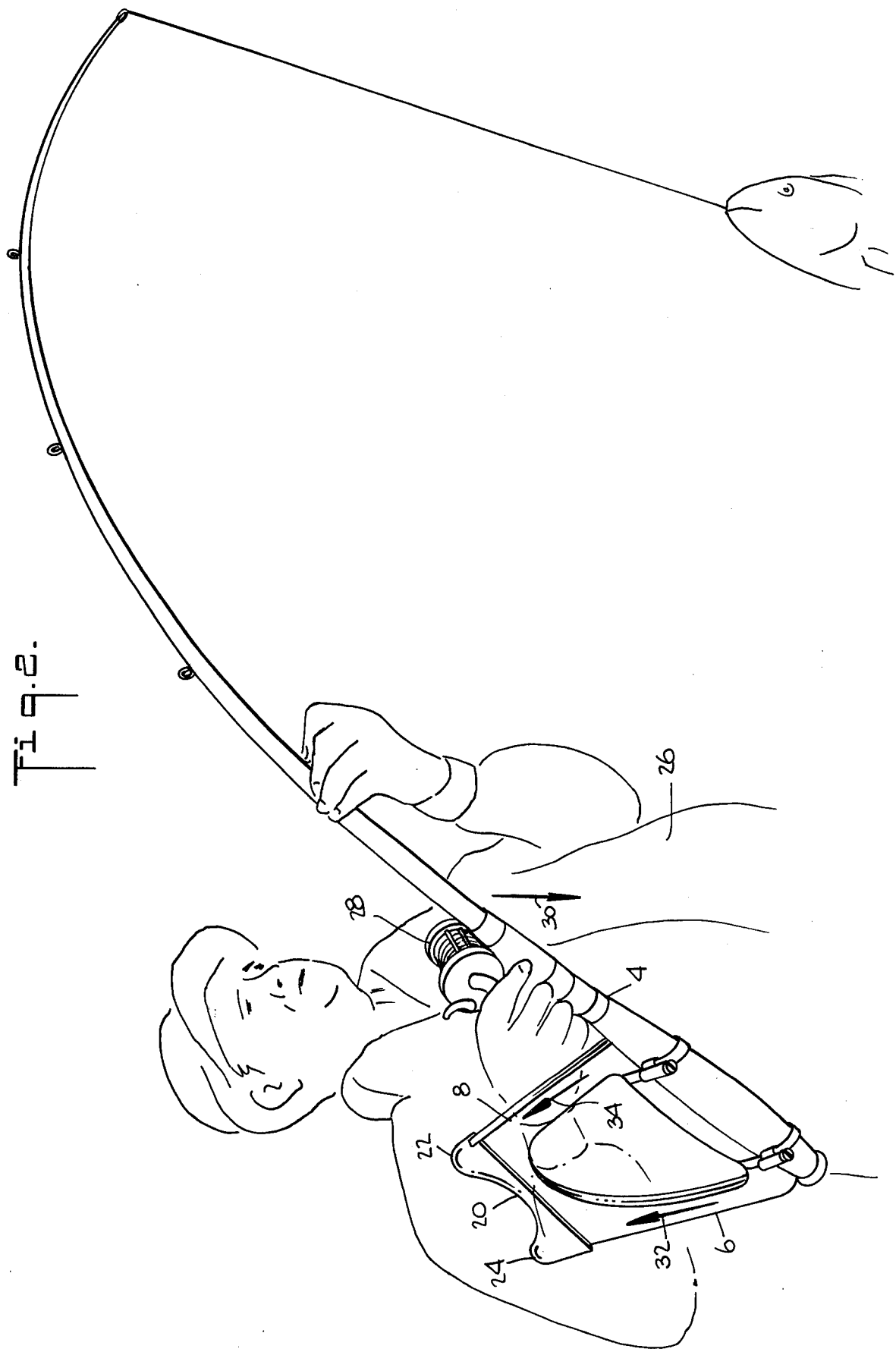
FIG. 2 is an isometric view of the device shown in use.

FIG. 2 shows the leverage brace 2 in actual use. The fisherman 26 is shown handling the reel 28 and rod 4 without any requirement of manually retaining the leverage brace 2 with his hand. The concavity 20 of the upper section 12 is shown nested in the underarm of the fisherman 26. The elevations 22 and 24 are shown somewhat above the underarm area of the fisherman 26 regardless of the fisherman's orientation. Thus, positive securement of the leverage brace 2 is provided.

In operation it can be seen that any force such as shown by arrow 30 is naturally and automatically transmitted through columns 6 and 8 as shown by arrows 32 and 34 to the underarm of the fisherman 26. The fisherman 26 is not required to make any adjustment or provide any manipulative action to tend to the leverage brace 2. The fisherman's hands remain free to manipulate the reel 28 and rod 4.

In the preferred embodiment the leverage brace 2 is constructed of a rigid styrofoam with a polyethylene covering. This design provides sufficient structure to react the pressure imposed by the forces attending normal fishing operations. The design also provides flotation to enable the entire rod, reel and brace assembly to float if the pole is inadvertently dropped in the water.

I claim:

1. A leverage brace for reacting forces imposed on a fishing rod comprising:
   a. a rigid column extending from the handle of the fishing pole to an upper surface;
   b. an upper surface contoured to conform to the underarm of a fisherman; and
   c. wherein the brace is formed of material having a lower density than water.

2. A leverage brace as in claim 1 further comprising a forward and rear elevation on the upper surface of the leverage brace and wherein the upper surface of the leverage brace conforms to the contour of the fisherman's underarm by virtue of a concave formation in the upper surface.

3. A leverage brace as in claim 2 further comprising a plurality of rigid columns through which force is transmitted from the fishing rod upwardly to the underarm of the fisherman.

4. A leverage brace as in claim 3 further comprising a base section extending from one rigid column to another rigid column which base surface is provided with a surface to conform to the contour of the fishing rod handle; and means for attaching the leverage brace to the fishing rod.

5. A leverage brace as in claim 4 wherein the means for attaching the leverage brace to the fishing rod are a plurality of clamps which provide a variable force on the fishing rod and the base of the leverage brace to retain the leverage brace in an orientation projecting vertically upward.

6. A leverage brace as in claim 1 wherein the brace is formed of styrofoam and a polyethylene covering.

* * * * *